United States Patent
Kaneko

(10) Patent No.: US 8,203,565 B2
(45) Date of Patent: Jun. 19, 2012

(54) DEVICE CONTROL USING DATA COMMUNICATION

(75) Inventor: Eiji Kaneko, Higashichikuma-gun (JP)

(73) Assignee: Seiko Epson Corporation, Tokyo (JP)

(*) Notice: Subject to any disclaimer, the term of this patent is extended or adjusted under 35 U.S.C. 154(b) by 77 days.

(21) Appl. No.: 12/775,618

(22) Filed: May 7, 2010

(65) Prior Publication Data

US 2010/0214303 A1    Aug. 26, 2010

Related U.S. Application Data

(63) Continuation of application No. 11/674,509, filed on Feb. 13, 2007, now Pat. No. 7,742,051.

(30) Foreign Application Priority Data

Mar. 27, 2006    (JP) .................................. 2006-085922

(51) Int. Cl.
  G09G 5/00    (2006.01)
  G06T 1/20    (2006.01)
  G01R 31/08    (2006.01)
  H04L 12/28    (2006.01)
  G06K 9/36    (2006.01)
  G06K 9/40    (2006.01)

(52) U.S. Cl. ........ 345/506; 345/619; 345/634; 370/230; 370/389; 370/390; 370/395.1; 382/235; 382/260

(58) Field of Classification Search .................. 345/506, 345/619, 634; 370/230, 389, 390, 395.1; 382/235, 260

See application file for complete search history.

(56) References Cited

U.S. PATENT DOCUMENTS

| | | | |
|---|---|---|---|
| 7,336,385 B2 | 2/2008 | Yokoyama | |
| 7,847,755 B1* | 12/2010 | Hardebeck et al. | 345/2.2 |
| 2002/0030694 A1 | 3/2002 | Ebihara et al. | |
| 2004/0012600 A1 | 1/2004 | Deering et al. | |
| 2004/0189669 A1 | 9/2004 | David et al. | |
| 2005/0135427 A1 | 6/2005 | Machimura et al. | |
| 2007/0122022 A1* | 5/2007 | Shimizu et al. | 382/135 |

FOREIGN PATENT DOCUMENTS

| | | |
|---|---|---|
| JP | A-07-281914 | 10/1995 |
| JP | A-09-237224 | 9/1997 |

(Continued)

*Primary Examiner* — Brandon Renner
(74) *Attorney, Agent, or Firm* — Oliff & Berridge, PLC

(57) ABSTRACT

A data processing device connected with a data supply device for performing predetermined data processing includes: a communication control unit for controlling communication with the data supply device; a data processing unit for performing the data processing based on input data received from the data supply device; and a device control unit for performing predetermined processing in correspondence with command data received from the data supply device based on the command data. The communication control unit receives the input data and the command data each of which is contained in a packet having a common fixed length from the data supply device. When an identification part at a predetermined position in the reception packet received from the data supply device is set at a predetermined command identification value indicating the command data, the communication control unit supplies data contained in the reception packet to the device control unit. When the identification part is set at a value different from the command identification value, the communication control unit supplies data contained in the reception packet to the data processing unit. The device control unit uses the remaining part in the reception packet other than the identification part as the command data. The data processing unit uses the remaining part as the input data.

19 Claims, 13 Drawing Sheets

FOREIGN PATENT DOCUMENTS

| | | |
|---|---|---|
| JP | A-11-338651 | 12/1999 |
| JP | A-2001-16574 | 1/2001 |
| JP | A-2001-144795 | 5/2001 |
| JP | A-2001-313651 | 11/2001 |
| JP | A-2003-46592 | 2/2003 |
| JP | A-2004-178348 | 6/2004 |

* cited by examiner

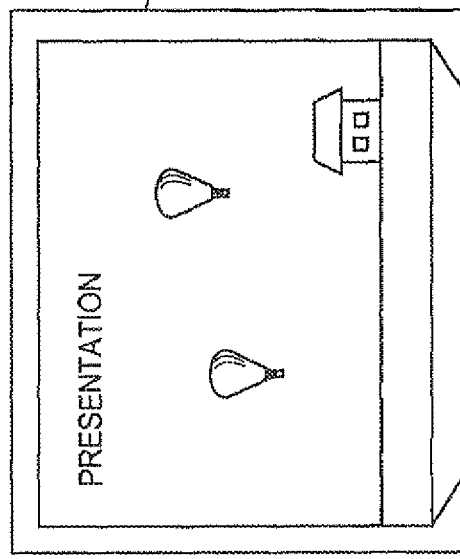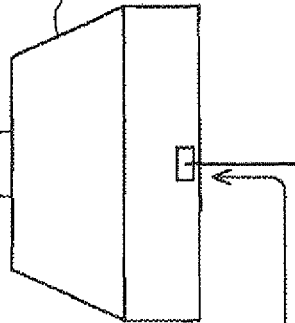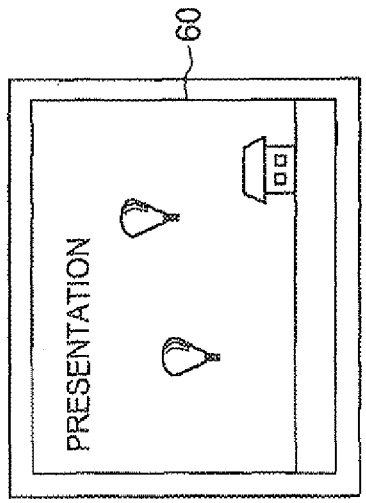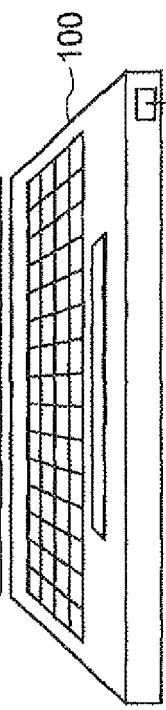
FIG. 1

COMMAND FORMAT

DISPLAY DATA FORMAT (HEADER)

DISPLAY DATA FORMAT (IMAGE DATA: CONTINUING)

DISPLAY DATA FORMAT (IMAGE DATA: LAST)

| | CONTROL DATA FIELD | ADDRESS FIELD | COMMAND CODE | IDENTIFIER BIT |
|---|---|---|---|---|
| C1 | 0000h (OFF) | 00h (ON/OFF) | 000010b LAMP CONTROL (DATA WRITE) | 11b |
| C2 | 0001h (ON) | | | |
| C3 | 0000h (LOW LUMINANCE) | 01h (LUMINANCE) | | |
| C4 | 0001h (HIGH LUMINANCE) | | | |
| C5 | 0000h (OFF) | 05h (ON/OFF) | 000020b FAN CONTROL (DATA WRITE) | |
| C6 | 0001h (ON) | | | |

FIG. 4

READ COMMAND (THIRD EMBODIMENT)

| | ADDRESS FIELD | COMMAND CODE | IDENTIFIER BIT |
|---|---|---|---|
| C11 | 00h (ON/OFF) | 000011b LAMP CONDITION (DATA READ) | 11b |
| C12 | 01h (LUMINANCE) | | |
| C13 | 05h (ON/OFF) | 000021b FAN CONDITION (DATA READ) | |

READ COMMAND RESPONSE FORMAT (THIRD EMBODIMENT)

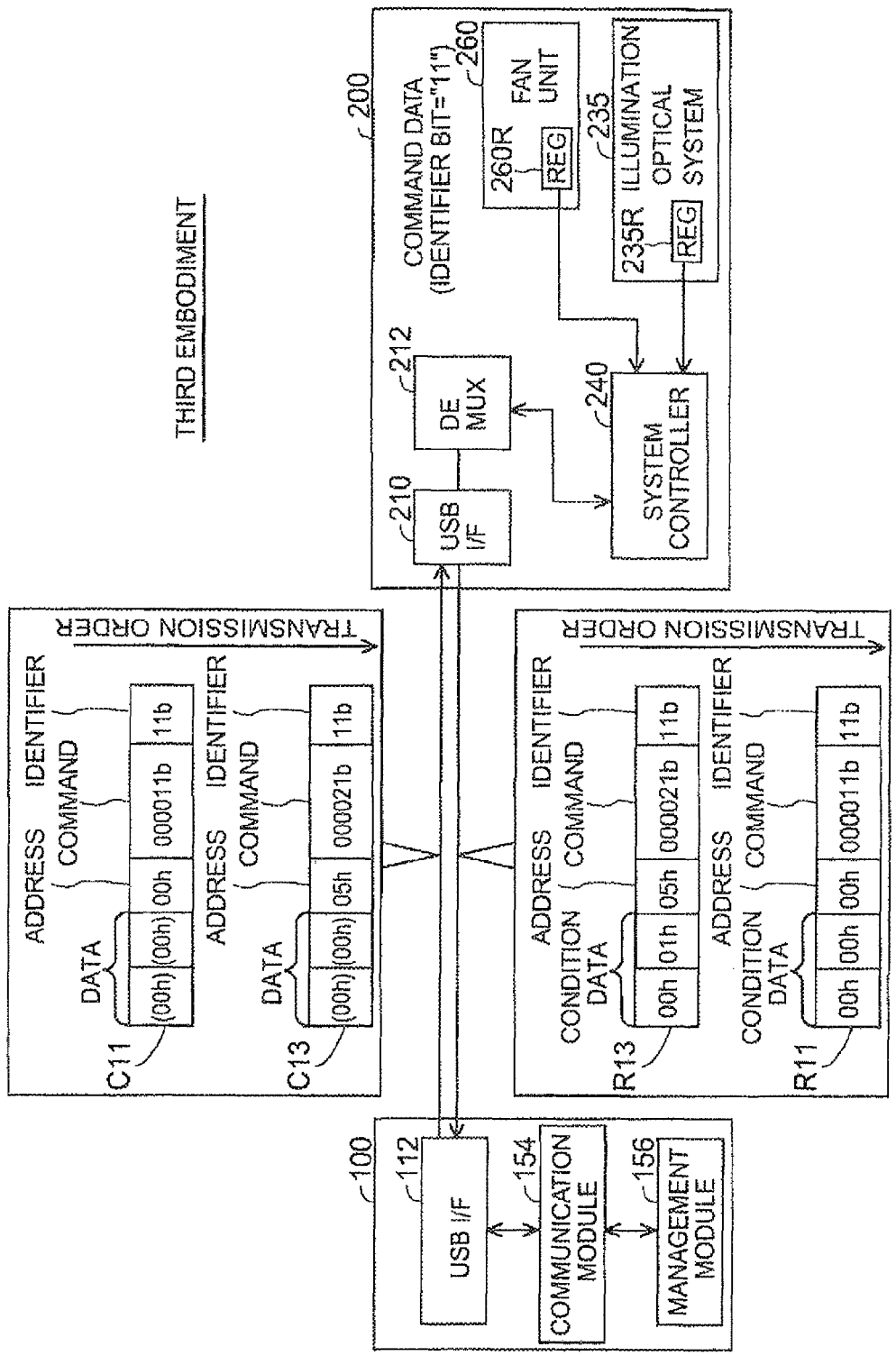

ROM READ COMMAND FORMAT (FOURTH EMBODIMENT)

ROM READ COMMAND RESPONSE FORMAT (FOURTH EMBODIMENT)

DEVICE CONTROL USING DATA COMMUNICATION

This is a Continuation of application Ser. No. 11/674,509 filed Feb. 13, 2007, which claims the benefit of Japanese Patent Application No. 2006-085922 filed Mar. 27, 2006. The disclosures of the prior applications are hereby incorporated by reference herein in their entirety.

BACKGROUND

1. Technical Field

The present invention relates to device control using data communication.

2. Related Art

Currently, an image output device such as a projector and a printer is connected with a computer and operated under the control of the computer. The image output device outputs an image based on command codes, parameters, and data transmitted in a predetermined order from the computer to the image output device using a communication system having been proposed (for example, see JP-A-11-338651).

For enhancing usability of the image output device for a user, it is preferable to use communication with the computer not only for the control over image output but also for various controls (such as control over operation conditions of a fan in a projector). For providing various controls through communication, however, a complicated communication system is currently required to deal with various types of controls.

This problem arises not only from the control over the image output device but also from controls for various data processing devices.

SUMMARY

An advantage of some aspects of the invention is to provide a technique for reducing complication of communication used for various device controls.

A data processing device connected with a data supply device for performing predetermined data processing according to a first aspect of the invention includes: a communication control unit for controlling communication with the data supply device; a data processing unit for performing the data processing based on input data received from the data supply device; and a device control unit for performing predetermined processing in correspondence with command data received from the data supply device based on the command data. The communication control unit receives the input data and the command data each of which is contained in a packet having a common fixed length from the data supply device. (a1) When an identification part at a predetermined position in the reception packet received from the data supply device is set at a predetermined command identification value indicating the command data, the communication control unit supplies data contained in the reception packet to the device control unit. (a2) When the identification part is set at a value different from the command identification value, the communication control unit supplies data contained in the reception packet to the data processing unit. The device control unit uses the remaining part in the reception packet other than the identification part as the command data. The data processing unit uses the remaining part as the input data.

According to the data processing device, each of the input data and the command data is transmitted in a packet having the common fixed length. Thus, the communication processes can be simplified. Moreover, since the data type contained in the packet is identified based on the value of the identification part at the predetermined position in the packet, the input data and command data can be separately and properly used. Accordingly, communication for various controls does not become complicated.

It is preferable that the data processing device according to the first aspect of the invention has the following structure. The input data is display data containing header data having size information on an image and image data showing the image. The data processing unit performs processing for outputting the image based on the display data. The data processing unit obtains the entire display data by receiving a header packet which contains the header data and a plurality of image packets each of which contains a divided part of the image data. (b1) When the identification part is set at a predetermined header identification value indicating the header data, the data processing unit uses the remaining part as the header data. (b2) When the identification part is set at a predetermined continuing image identification value indicating continuation of image data, the data processing unit uses the remaining part as the image data. (b3) When the identification part is set at a predetermined last image identification value indicating the last image data the data processing unit uses the remaining part as the image data and judges that reception of the entire image data has been completed.

According to this structure, each of the header data and the image data is received in a packet having the fixed length. Thus, the communication processes can be simplified. Moreover, when the image data to be received is divided into plural parts, the image data continuing to the next image data and the last image data are separately identified based on the values of the identification parts. Accordingly, completion of reception of the entire image data can be appropriately judged.

It is preferable that the data processing device according to the first aspect of the invention has the following structure. The data processing unit performs processing for displaying the image on a display screen as processing for outputting the image. The header data contains information on the position of the image in the display screen. The data processing unit displays an image whose all n partial images (n: 2 or larger integers) contained in the display screen and each having a different position have been renewed on the display screen by sequentially receiving n display data each of which indicates the corresponding partial image one by one. The data processing unit receives the header packet and obtains a whole unit of display data by receiving all the plural image packets after receiving the header packet. (c1) For each of the initial (n−1) display data, the data processing unit receives all the plural image packets for a unit of display data as image packets whose identification parts are set at the continuing image identification value, and judges that reception of all the image packets has been completed by receiving the header packet of the next display data. (c2) For the last nth display data, the data processing unit receives all the image packets other than the last image packet as image packets whose identification parts are set at the continuing image identification value, and receives the last image packet as an image packet whose identification part is set at the last image identification value judging that reception of all the image packets for the last nth display data and reception of all the display data are completed by receiving the last image packet.

According to this structure, when the plural partial images are received, the display data of the respective partial images are sequentially received one by one and the header packet identified separately from the image packets is received at the initial part of each display data. Thus, the respective display data can be appropriately identified. Moreover, since only the identification part at the last image packet of the last display data is set at the last image identification value, completion of reception of the entire display data can be appropriately judged.

It is preferable that the data processing device according to the first aspect of the invention has the following structure. The data processing device further includes a memory for storing data to be transmitted to the data supply device in a plurality of storage areas each having a different address. The memory includes a first memory having a first address length and a second memory having a second address length longer than the first address length. The command data is set from plural types of command data including first read command data for reading data from the first memory and second read command data for reading data from the second memory. (d1) When a command part at a predetermined position in the remaining part of the reception packet is set at a predetermined first read identification value indicating the first read command data, the device control unit uses a first address part having the first address length at a predetermined position in a rest part of the reception packet other than the identification part and the command part as a read target address. (d2) When the command part is set at a predetermined second read identification value indicating the second read command data, the device control unit uses a second address part having the second address length at a predetermined position in the rest part of the reception packet other than the identification part and the command part as a read target address.

According to this structure, addresses having different data lengths contained in the packets can be identified based on the values of the respective command parts. Thus, when data is read from the first memory and the second memory having different address lengths, the addresses having different data lengths can be appropriately used as separate addresses.

It is preferable that the data processing device according to the first aspect of the invention has the following structure. The device control unit transmits target data stored at the address of the memory designated by the received read command data in the packets having the fixed length to the data supply device in response to reception of the respective read command data, and receives respective new read command data before transmission of the target data. (e1) The device control unit transmits a first data packet having the identification part, the command part, and the first address part set at the same values as those of the original first read command data and the rest part containing the target data as a response to the first read command data. (e2) The device control unit transmits a second data packet having the identification part and the command part set at the same values as those of the original second read command data and the rest part containing the target data as a response to the second read command data without containing the target address. In communication between the communication control unit and the data supply device, the order of reception of a plurality of packets by the receptor side is the same as the order of transmission of the plural packets by the transmitter side. When the device control unit newly receives the second read command data before transmitting a response to the second read command data received earlier, the device control unit transmits the response to the earlier second read command data before transmitting a response to the later second read command data and then transmits the response to the later second read command data.

According to this structure, the first data packet which contains the same identification part, the command part, and the first address part as those of the original first read command data and the target data in the rest part is transmitted for the first read command data having a relatively short address length. Thus, the data supply device can easily specify the correspondence between the received target data and the transmitted first read command data. The second data packet for the second read command data having a relatively long address length has no address. Thus, the target data can be contained in one second data packet. Moreover, since the response to the earlier second read command data is transmitted before transmission of the response to the later second read command data, the data supply device can easily specify the correspondence between the received target data and the transmitted second read command data based on the order of reception of the target data.

It is preferable that the data processing device according to the first aspect of the invention has the following structure. The data processing device further includes a first-in first-out memory for storing the target data read from the second memory and supplying the stored target data to the device control unit. The device control unit issues read requirement for reading data from the second memory based on the earlier second read command data and then issues read requirement for reading data from the second memory based on the later second read command data. The device control unit obtains target data read by the respective read requirements from the first-in first-out memory and transmits the second data packet containing the obtained target data in the order of acquirement from the first-in first-out memory without checking the address of the obtained target data.

According to this structure, the device control unit need not supervise the order of transmission of the target data read from the second memory. Thus, the processes performed by the device control unit can be simplified.

A communication system according to a second aspect of the invention is a communication system between a data supply device and a data processing device connected with the data supply device for performing predetermined data processing. The data processing device performs the data processing based on input data received from the data supply device and performs predetermined processing in correspondence with command data received from the data supply device based on the command data. The data supply device supplies the input data and the command data each of which is contained in a packet having a common fixed length to the data processing device. The data supply device performs the processes of: (a) setting an identification part at a predetermined position in the packet at a predetermined command identification value indicating the command data and storing the command data in a remaining part in the packet other than the identification part for transmitting the command data; and (b) setting the identification part at a value different from the command identification value and storing the input data in the remaining part for transmitting the input data. The data processing device performs the processes of: (c) using the remaining part of the reception packet received from the data supply device as the command data when the identification part at the reception packet is set at the command identification value; and (d) using the remaining part of the reception packet as the input data when the identification part at the reception packet is set at a value different from the command identification value.

According to this communication system, each of the input data and the command data is transmitted in a packet having the common fixed length. Thus, the communication processes can be simplified. Moreover, since the data types contained in the packet is identified based on the value of the identification part at the predetermined position in the packet, the input data and the command data can be separately and properly used. Accordingly, communication for various controls does not become complicated.

The invention may be practiced for a wide variety of applications. For example, the invention is applicable to a data processing system, data supply device and data processing device constituting a data processing system, communication method and communication system used between these devices, data supply method and data processing method, a computer program for these methods and devices, a recording medium recording this computer program, and other applications. Data processing may be various types of processing such as image output and image display.

BRIEF DESCRIPTION OF THE DRAWINGS

The invention will be described with reference to the accompanying drawings, wherein like numbers refer to like elements.

FIG. 1 illustrates a structure of an image display system in an embodiment according to the invention.

FIG. 4 shows an example of a command packet.

FIG. 11 schematically shows issue of a read command from the computer 100.

DESCRIPTION OF EXEMPLARY EMBODIMENTS

Figure 2:
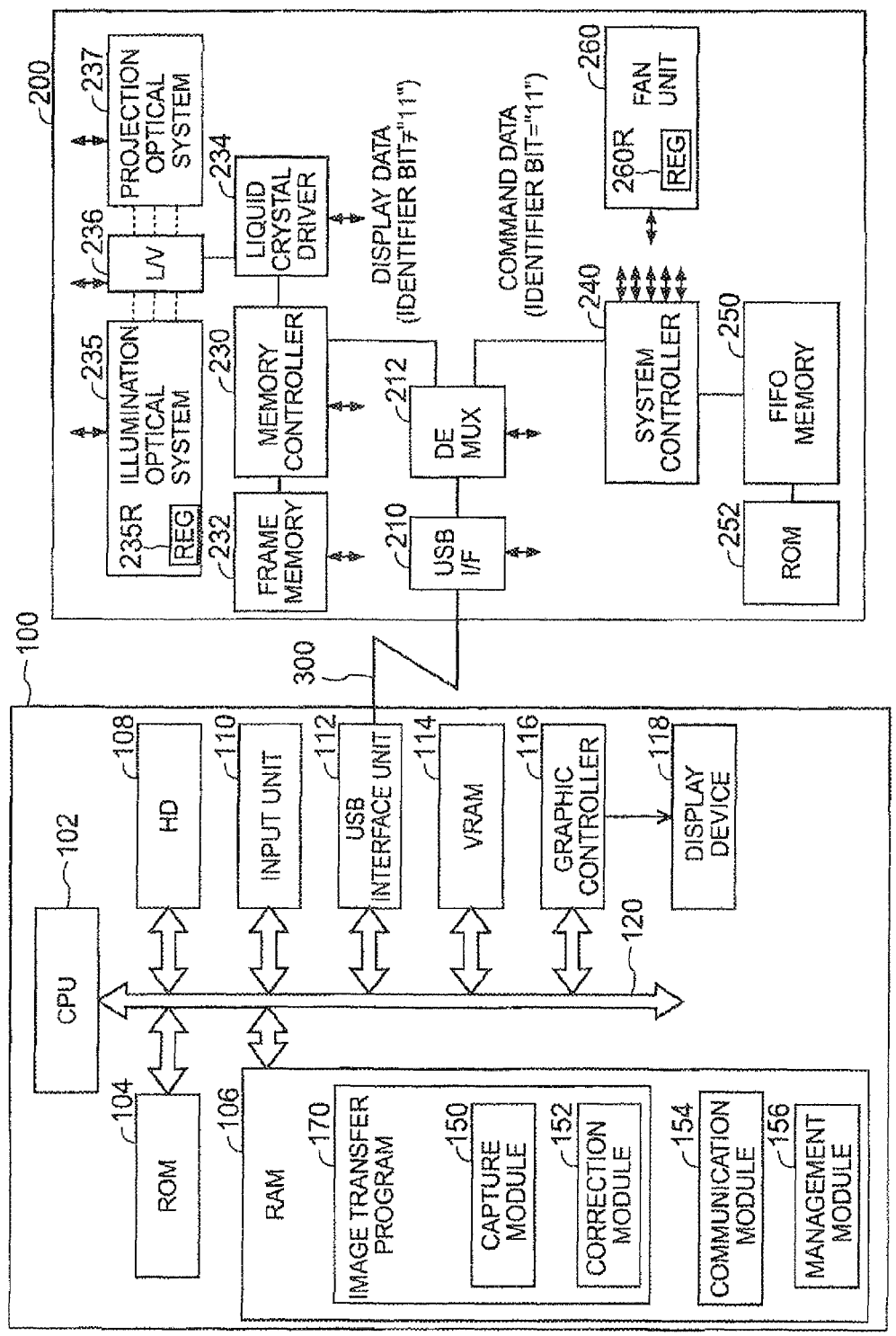
FIG. 2 is a block diagram showing internal structures of a computer 100 and a projector 200.

Preferred embodiments according to the invention are hereinafter described in the following order:
A. First Embodiment
B. Second Embodiment
C. Third Embodiment
D. Fourth Embodiment
E. Modified Example A. First Embodiment FIG. 1 illustrates a structure of an image display system in an embodiment according to the invention. An image display system 10 in this embodiment includes a personal computer 100 as an image supply device, a projector 200 as an image display device, and a USB cable 300 for connecting the computer 100 and the projector 200. The computer 100 has a function of supplying images to the projector 200 via the USB cable 300 so that the projector 200 can project the images on a projection display screen 70 (screen).

FIG. 2 is a block diagram showing internal structures of the computer 100 and the projector 200. The computer 100 has a CPU 102, a ROM 104, a RAM 106 as a general-purpose memory (also referred to as "system memory"), a hard disk drive 108, an input unit 110 constituted by a keyboard, a pointing device and others, a USB interface unit 112, a VRAM 114 as a frame memory, a graphic controller 116, a display device 118 as a liquid crystal display, and a bus 120 for connecting the respective components. The input unit 110 receives commands from a user and supplies the received commands to the respective components of the computer 100.

The RAM 106 has various computer programs such as an image transfer program 170, a communication module 154, and a management module 156. The image transfer program 170 has a capture module 150 and a correction module 152. These computer programs are recorded in a recording medium to be read by computers such as a flexible disk and a CD-ROM and supplied to the RAM 106.

The projector 200 includes a USB interface unit 210, a demultiplexer 212, a memory controller 230, a frame memory 232, a liquid crystal driver 234, an illumination optical system 235 having a lamp, a liquid crystal light valve 236 (also referred to as "liquid crystal panel"), a projection optical system 237, a system controller 240, a ROM 252, a FIFO (first-in first-out) memory 250, and a fan unit 260 as a cooling device.

The communication module 154 of the computer 100 and the demultiplexer 212 of the projector 200 control the USB interface units 112 and 210, respectively, and use USB protocols for data communication. The data communication by the communication module 154 and the demultiplexer 212 exchanges packets having fixed lengths. The image transfer program 170 transmits display data (including image data) to the projector 200 by controlling the communication module 154. The management module 156 transmits command data to the projector 200 by controlling the communication module 154. The display data and the command data are separately identified based on a part of bit information at a predetermined position in the packet (details of the identification will be described later).

The demultiplexer 212 having received a packet for display data supplies the received data to the memory controller 230. The memory controller 230 gives the image data contained in the received data to the frame memory 232. The memory controller 230 supplies the image data contained in the frame memory 232 to the liquid crystal driver 234. The liquid crystal driver 234 controls the liquid crystal light valve 236 in accordance with the received image data. The liquid crystal light valve 236 modulates illumination light emitted from the illumination optical system 235. The projection optical system 237 projects the projection light modulated by the liquid crystal light valve 236 on the projection display screen 70. An image is thus projected on the projection display screen 70 for display.

The demultiplexer 212 having received a packet for command data supplies the received data to the system controller 240. The system controller 240 controls the respective components of the projector 200 in accordance with the received command data. In the first embodiment, a part of the components of the projector 200 operate based on data values contained in registers (memory) provided in the corresponding components. The system controller 240 controls the respective components according to control data written to the registers. According to the example shown in FIG. 2, the illumination optical system 235 and the fan unit 260 have registers 235R and 260R, respectively. The illumination optical system 235 and the fan unit 260 have not-shown controllers, and the controllers control the illumination optical system 235 and the fan unit 260 in accordance with the values in the registers. For example, the fan unit 260 starts actuating when data indicating actuation is written to the register 260R of the fan unit 260, and the fan unit 260 stops when data indicating stop is written thereto.

The demultiplexer 212, the memory controller 230, and the system controller 240 are constituted by logical circuits.

Figure 3A:
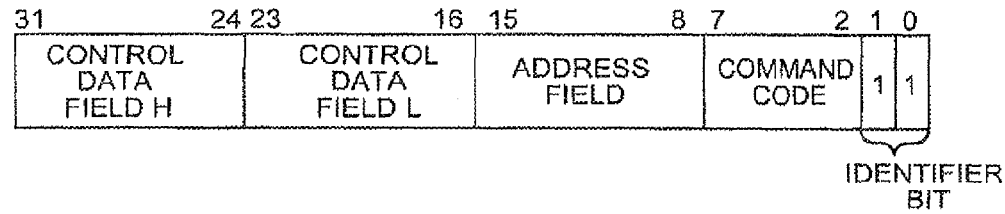
FIGS. 3A through 3D show formats of respective packets.
Figure 3B:
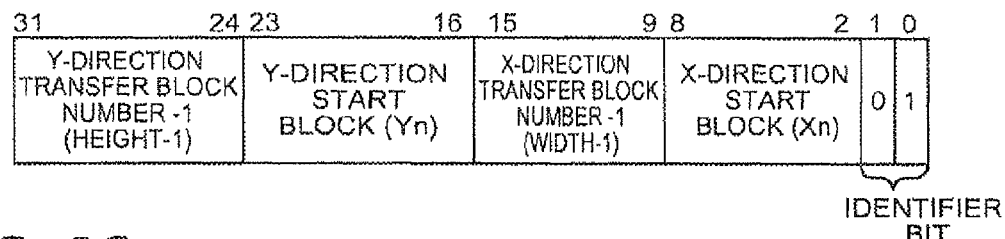
Figure 3C:
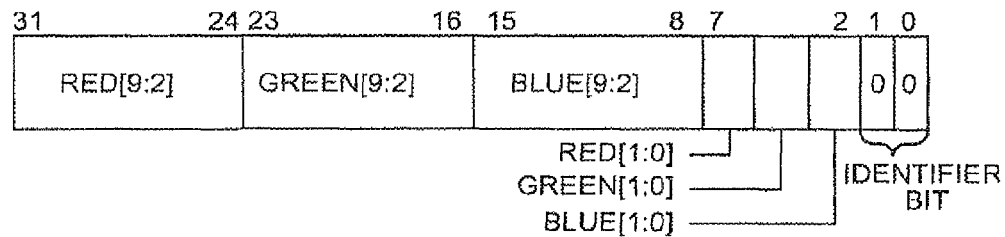
Figure 3D:
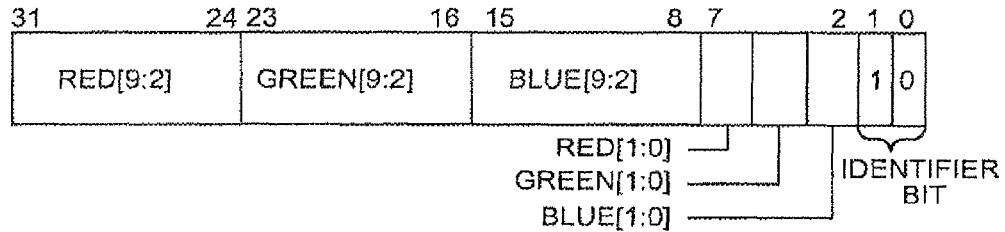

FIGS. 3A through 3D show formats of packets to be exchanged between the communication module 154 and the demultiplexer 212. FIG. 3A shows a packet for command data, and FIGS. 3B, 3C and 3D show packets for display data. When image data is transmitted, a header packet (FIG. 3B) is initially transmitted. Subsequently, the image data packets (FIGS. 3C and 3D) are transmitted. The image data is divided into a plurality of packets, and the respective packets are sequentially transmitted. FIG. 3C shows the intermediate image data packet, and FIG. 3D shows the last image data packet.

As shown in the figures, each length (size) of the packets is 32 bits in the first embodiment. The first two bits (0th and the 1st bits) in the 32 bits are identifiers indicating packet type. The values of the identifier bits are set at "11b (b: binary notation, the same as follows)" in the command packet (FIG. 3A), "01b" in the header packet (FIG. 33), "00b" in the intermediate image data packet (FIG. 3C), and "10b" in the last image data packet (FIG. 3D). Thus, "00b" means that the image data packet still continues, and "10b" means that the image data packet ends.

As illustrated in FIG. 3A, the 2nd through 7th bits in the command packet indicate a command code, the 8th through 15th bits indicate an address, the 16th through 23rd bits indicate the lower part of the control data, and the 24th through 31st bits indicate the upper part of the control data. The command packet shown in FIG. 3A is a packet used for writing control data to the registers of the components in the projector 200. The command code is set at a code number given exclusively to the component as the control target. The address is set at a register address given exclusively to the corresponding register. When one component has a plurality of registers, a different register address is given to each of the registers of one component. However, the same register address may be given to registers equipped in different components.

FIG. 4 shows an example of a command packet. The figure contains six commands C1 through C6. The commands C1 through C4 having the command code set at "000010b" are commands for controlling the lamp of the illumination optical system 235. The commands C1 and C2 having the address "00h (h: hexadecimal notation, the same as follows)" in the commands C1 through C4 are commands for controlling the on-off condition of the lamp. In this case, the first command C1 having the control data set at "0000h" is a command for turning off the lamp, while the second command C2 having the control data set at "0001h" is a command for turning on the lamp.

The commands C3 and C4 having the address set at "01h" in the commands C1 through C4 are commands for controlling the luminance of the lamp. In the first embodiment, the luminance of the lamp can be switched between two levels of "high luminance" and "low luminance". In this case, the third command C3 having the control data set at "0000h" is a command for setting the luminance of the lamp at "low luminance", while the fourth command C4 having the control data set at "0001h" is a command for setting the luminance of the lamp at "high luminance".

The commands C5 and C6 having a command code set at "000020b" are commands for controlling the fan unit 260 (FIG. 2). In this case, the address of the commands C5 and C6 set at "05h" indicates commands for controlling the operation condition of the fan unit 260. The fifth command C5 having the control data set at "0000h" is a command for stopping the fan unit 260, while the sixth command C6 having the control data set at "0001h" is a command for actuating the fan unit 260.

Figure 5:
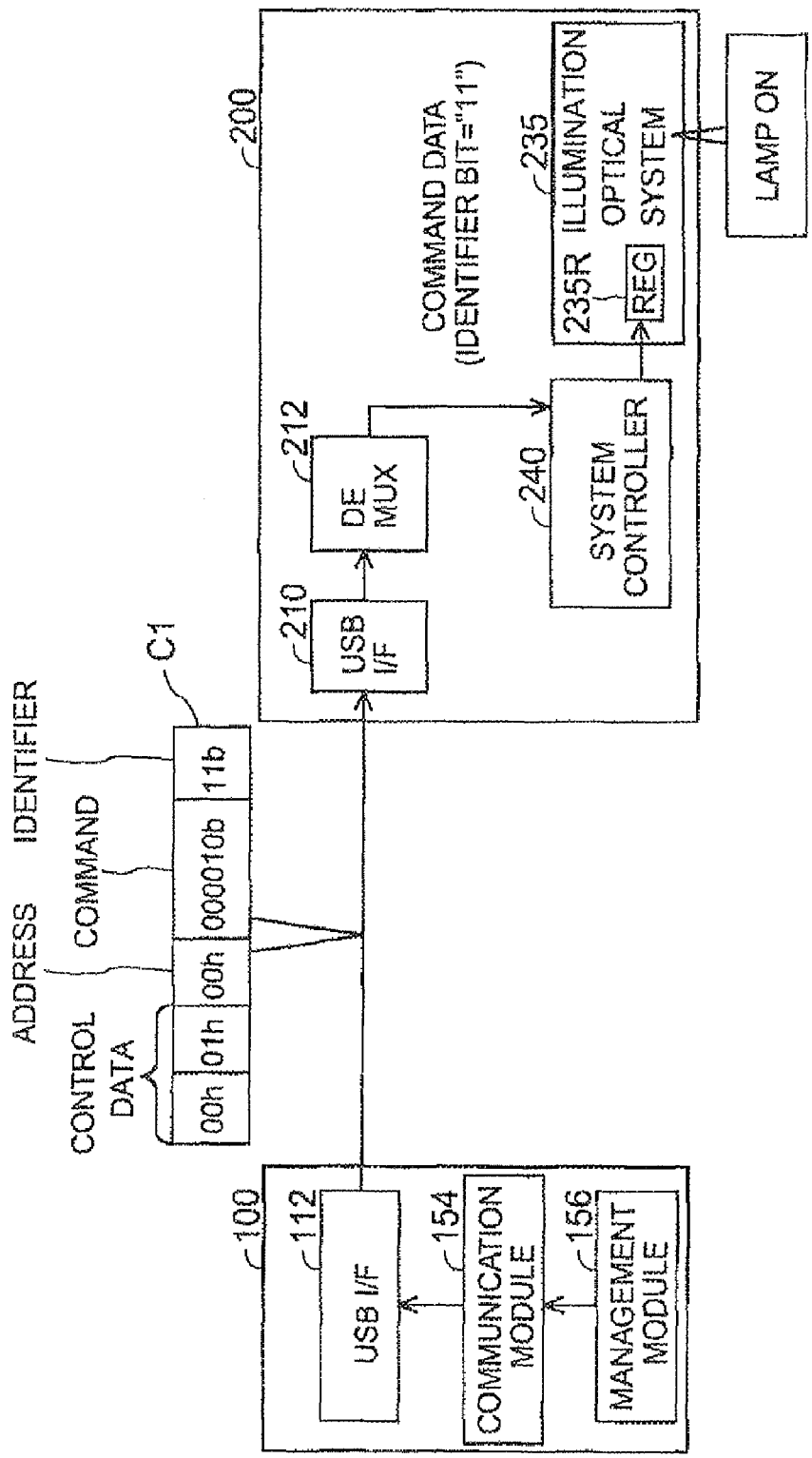
FIG. 5 schematically shows transmission of a command packet from the computer 100 to the projector 200.

FIG. 5 schematically shows transmission of a command packet from the computer 100 to the projector 200. In FIG. 5, only the USB interface unit 112, the communication module 154, and the management module 156 of the computer 100 are shown, and the other components thereof are not shown. Also, only the USB interface unit 210, the demultiplexer 212, the system controller 240, and the illumination optical system 235 of the projector 200 are shown, and the other components thereof are not shown.

FIG. 5 illustrates a case where the first command C1 is issued. Initially, the management module 156 supplies data for specifying the first command C1 (identifier bit, command code, address, and control data) to the communication module 154. The communication module 154 produces the first command C1 by using the data received from the management module 156, and transmits the first command C1 thus produced to the projector 200 according to the USB protocol.

In the projector 200, the demultiplexer 212 receives the packet via the USB interface unit 210. The demultiplexer 212 supplies the received data to the system controller 240 when the identifier bits of the received packet are set at "11b". The system controller 240 writes the control data contained in the received data to the register specified by the command code and address contained in the received data. According to the example shown in FIG. 5, the register whose address is "00h" in the register 235R of the illumination optical system 235 is selected based on the first command C1, and the control data "0001h" is written to the selected register. The control data "0001h" indicates ON condition. Thus, the illumination optical system 235 turns on the lamp.

When other commands are issued, the system controller 240 controls the corresponding components according to received commands in the similar manner. The management module 156 may issue commands in response to commands from the user, or may automatically issue commands. Requirements for automatically issuing commands may be arbitrarily determined. For example, the first command C1 may be issued in response to detection that the projector 200 has been connected with the computer 100.

Figure 6:
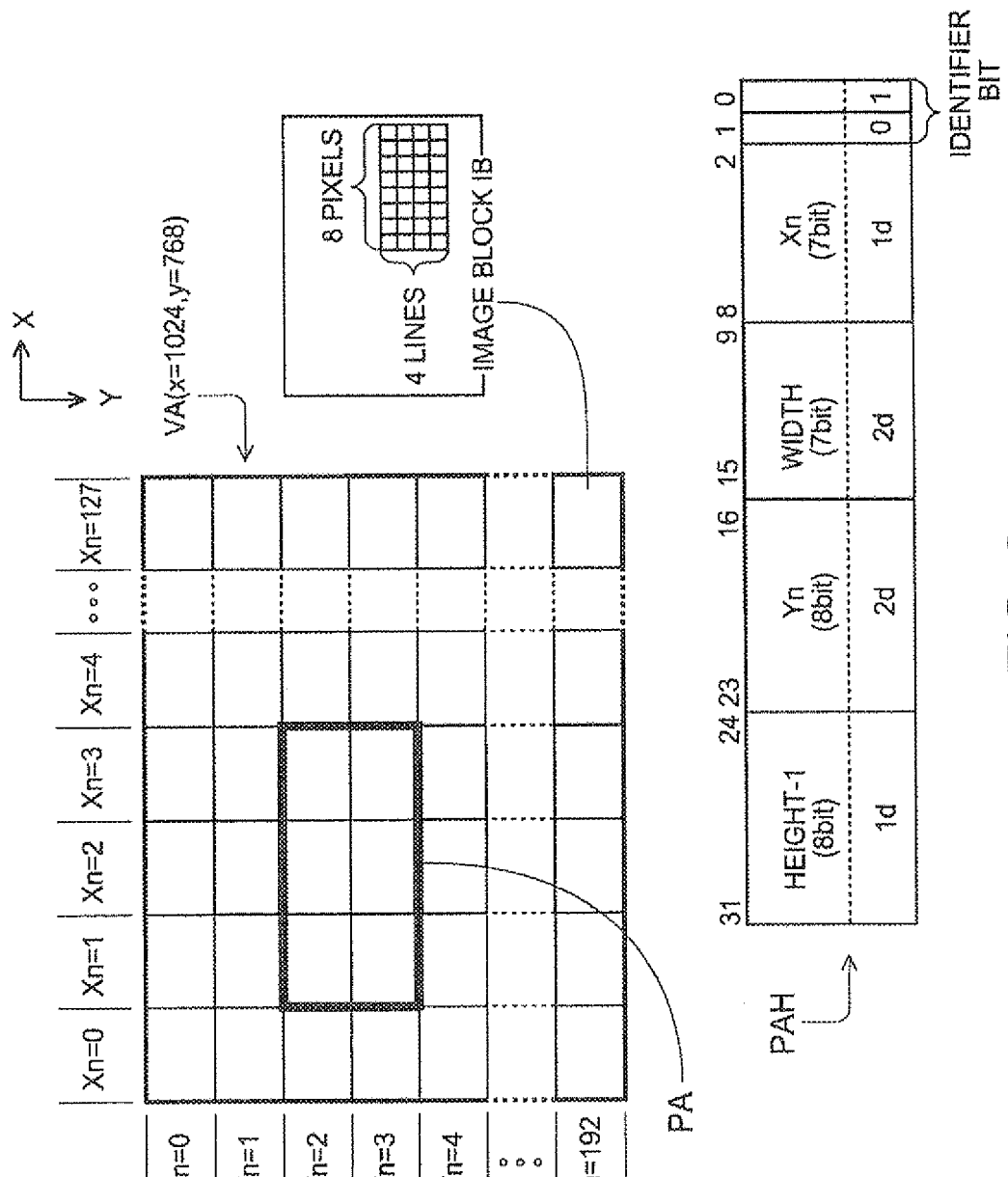
FIG. 6 shows display data.

FIG. 6 illustrates display data. In this figure, a display screen VA produced by the projector 200 is shown. In the first embodiment, the width of the display screen VA (pixel number in the x direction) has 1,024 pixels, and the height (pixel number in the y direction) has 768 pixels. The display screen VA is divided into a plurality of image blocks IB. The width of each image block IB has 8 pixels, and the height thereof has 4 pixels. Thus, the display screen VA has 128 image blocks IB in the x direction and 193 image blocks IB in the y direction. An X number $X_n$ indicating a position in the x direction and a Y number $Y_n$ indicating a position in the y direction are allocated to each of the image blocks IB in the display screen VA. The X number $X_n$ is set at an integer ranging from 0 to 127, and the Y number $Y_n$ is set at an integer ranging from 0 through 192.

For image data transmission, a rectangular area constituted by these image blocks IB is a transmission target. The position and size (height and width) of the rectangular area in the screen are included in the header packet (FIG. 3B). The position in the screen is indicated by the X number $X_n$ and Y number $Y_n$ of the reference block (such as the image block IB at the upper left corner) in the rectangular area. The size (height and width) is indicated by the number of the image blocks IB. According to the example shown in FIG. 3B, the 2nd through 8th bits indicate the X number $X_n$ of the reference block, the 9th through 15th bits indicate "width−1 (block number)" of the rectangular area, the 16th through 23rd bits indicate the Y number Yn of the reference block, and the 24th through 31st bits indicate "height−1 (block number)" of the rectangular area. In this embodiment, the image block IB at the upper left corner is used as the reference block.

FIG. 6 shows an example of the rectangular area. A rectangular area PA is a partial area in the display screen VA. The rectangular area PA has a width of 3 blocks and a height of 2 blocks. The X number Xn of the upper left block is 1, and the Y number Yn thereof is 2. FIG. 6 also shows a header packet PAH indicating the area PA. In the header packet PAH, the X number Xn is set at "1d (d: decimal notation, the same as follows)", and the Y number Yn is set at "2d". Also, the "width−1" is set at "2d", and the "height−1" is set at "1d".

Seven bits in the header packet are allocated to each of the "X number Xn" and the "width−1". The "X number Xn" is a number within the range from 0 to 127, and thus the "width−1" is a number within the range from 0 to 127. Therefore, both can be represented by 7 bits. On the other hand, 8 bits in the header packet are allocated to each of the "Y number Yn" and the "height−1". The "Y number Yn" is a number within the range from 0 to 192, and thus the "height−1" is a number within the range from 0 to 192. Therefore, both can be represented by 8 bits. Accordingly, the volume of information (bit number) for indicating the position and size of the rectangular area can be reduced by representing the position and size in reference to the image block IB. For example, when the position and size are represented in reference to pixels, 100 bits are needed for indicating a position in the x direction (0 through 1023). Thus, the position and size of the rectangular area can be represented in one packet. In this embodiment, the "width ~1" and the "height−1" are used in lieu of the "width" and "height" so as to reduce the volume of information. The size of the display screen VA and the size of the image block IB may be other sizes shown in FIG. 6. In any cases, it is preferable to determine the size of the image block IB such that the position and the size of the rectangular area can be indicated in one packet.

Figure 7:
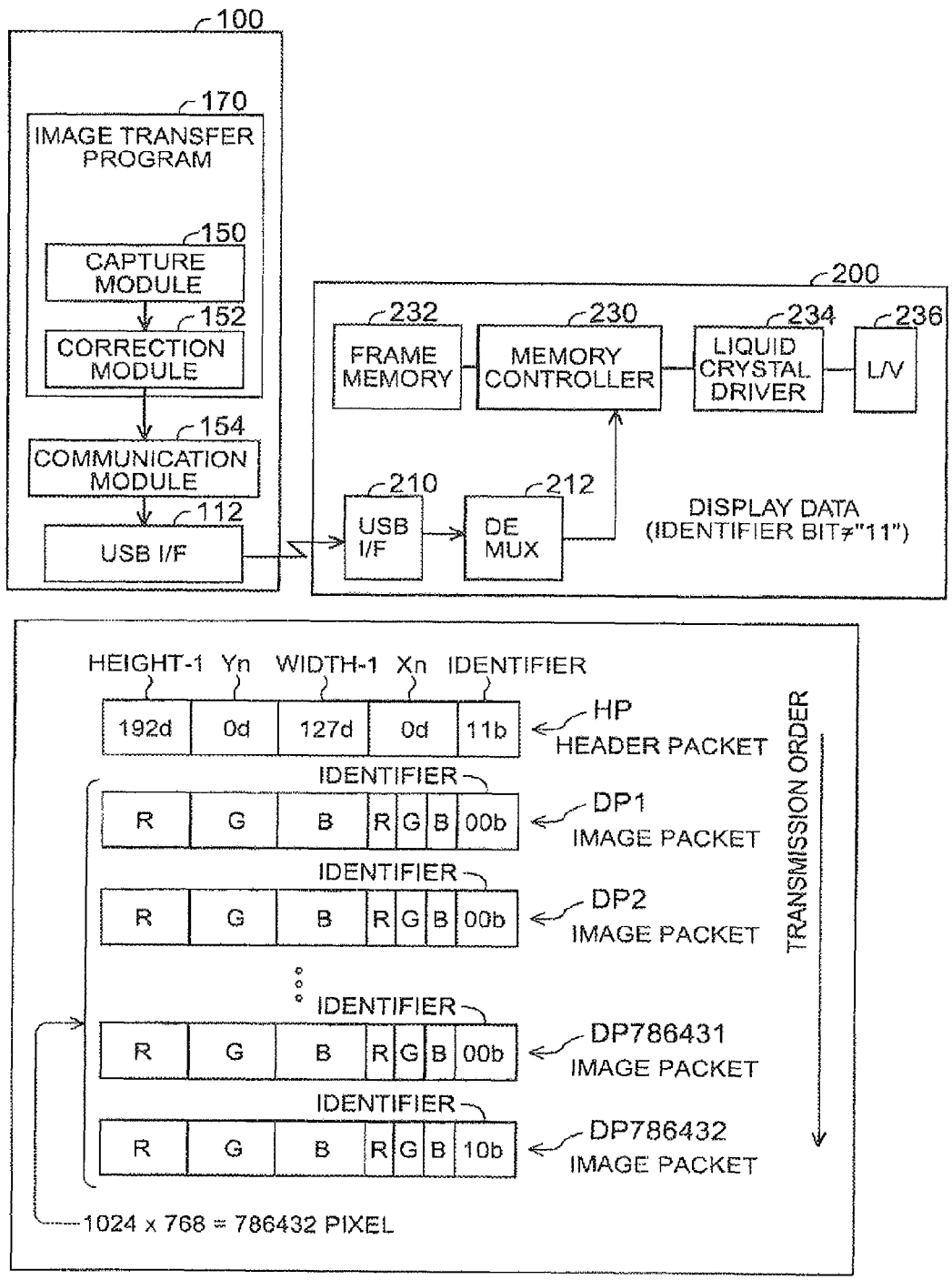
FIG. 7 schematically shows transmission of image data from the computer 100 to the projector 200.

FIG. 7 schematically illustrates transmission of image data from the computer 100 to the projector 200. In FIG. 7, only the USE interface unit 112, the communication module 154, the correction module 152, and the capture module 150 of the computer 100 are shown, and the other components thereof are not shown. On the other hand, only the USB interface unit 210, the demultiplexer 212, the memory controller 230, the frame memory 232, the liquid crystal driver 234, and the liquid crystal light valve 236 of the projector 200 are shown, and the other components thereof are not shown.

FIG. 7 shows a case where the entire display screen VA is transmitted. Initially, the capture module 150 obtains image data for display. The method for obtaining image data may be any methods. For example, when the same image as that displayed on the display device 118 of computer 100 (FIG. 2) is desired to be displayed by the projector 200, the image data may be acquired from the VRAM 114. The image data may be acquired by using an application program interface (API) for picture images. Alternatively, only images pictured by a particular application program may be displayed on the projector 200. In this case, the image data may be obtained by using this application program, or picturing commands issued by the application program may be hooked (snatched) to produce image data in accordance with the picturing commands. The API is generally constituted by a collection of procedures required when an application program uses various functions of an operating system.

Then, the capture module 150 supplies the obtained image data to the correction module 152. The correction module 152 applies predetermined correction to the supplied image data. In the first embodiment, VT (applied voltage V–light transmissivity T) correction is applied. The VT correction is a process for correcting image data (such as gradients of RGB color components) in accordance with non-linear input/output characteristics which are peculiar to the liquid crystal light valve 236. The correction process is not limited to the VT correction, but may be any other processes. For example, any process selected from the VT correction, scaling correction (expansion or contraction process), contrast correction, and gamma correction may be applied.

Next, the correction module 152 transmits the image data thus corrected to the projector 200 by controlling the communication module 154. FIG. 7 shows packets transmitted from the computer 100 to the projector 200. The correction module 152 initially transmits a header packet HP, and then sequentially transmits 786,432 image data packets DP1 through DP786,432.

The X number Xn of the header packet HP shown in FIG. 7 is set at "0d", and the Y number Yn thereof is set at "0d". The "width−1" is set at "127d", and the "height−1" is set at "192d". The correction module 152 supplies these data and identifier bits to the communication module 154. The communication module 154 produces the header packet HP by using the data received from the correction module 152, and transmits the produced header packet HP to the projector 200 according to the USB protocol.

Then, the correction module 152 transmits image data packets. In the first embodiment, a value of one pixel in the corrected image data is represented by a gradient of RGM color components. Each gradient of the color components is represented by 10 bits. One image data packet contains a value of one pixel. As shown in FIGS. 3C and 3D, the 2nd through the 7th bits in the image data packet indicate the 0th and the 1st bits of the RGM color components, the 8th through 15th bits indicate the 2nd through the 9th bits of the B component, the 16th through the 23rd bits indicate the 2nd through the 9th bits of the G component, and the 24th through 31st bits indicate the 2nd through the 9th bits of the R component. Ten bits of each color component are divided into 2 bits and 8 bits because the correction module 152 and the memory controller 230 can process data by 8 bits at high speed. However, each gradient of the color components may be represented by a succession of 10 bits in the image data packet. The number of bits of each color component may be other than 10. For example, each color component may be represented by 8 bits. In this case, the 8th through the 31st bits in the packet are used as bits for the gradients of each color component, and the 2nd through the 7th bits are used for other purposes.

As discussed above, the entire display screen VA is transmitted in the case shown in FIG. 7. Thus, the correction module 152 transmits 786,432 (1024*768) image data packets D1 through D786,432. The order of transmission of the pixels is a predetermined order. For example, the plural lines extending in the x direction are sequentially transmitted from the uppermost line. The plural pixels in one line are sequentially transmitted from the leftmost pixel.

The correction module 152 supplies the image data (pixel value data) and the identifier bits of each pixel to the communication module 154. The communication module 154 produces image data packets by using the data received from the correction module 152, and transmits the image data packets thus produced to the projector 200 according to the USB protocol. Only the identifier bits in the image data packet DP786,432 which is transmitted last are set at "10b".

The demultiplexer 212 of the projector 200 receives the packets via the USB interface unit 210. When the identifier bits in the received packet are set at a value other than "11b", the demultiplexer 212 supplies the received data to the memory controller 230. As a result, the header packet HP, the 786,432 image data packets DP1 through DP786,432 are supplied to the memory controller 230 in the order of reception of these packets.

The memory controller 230 stores the received image data in the frame memory 232. In this process, the position of each pixel on the screen is determined according to the data values in the header packet HP. When the image data of the last pixel (identifier bits are "10b") is stored in the frame memory 232, new supply of image data to the liquid crystal driver 234 is initiated. Consequently, the projector 200 can display new image transmitted from the computer 100.

In the first embodiment, the frame memory 232 has memory areas for two screens constituted by the display storage area containing image data in display and the renewal storage area containing renewal image data. The memory controller 230 stores the received image data in the renewal storage area. After storing the image data for renewal, the memory controller 230 uses the renewal storage area as a new display storage area, and supplies the image data stored in the new display storage area to the liquid crystal driver 234. Then, the memory controller 230 uses the old display storage area as a new renewal storage area. This switching of the storage areas is executed when storing of the image data in the packet whose identifier bits are set at "10b" is completed.

It is possible that the frame memory 232 has only a storage area for one screen. In this case, problems (such as image disorders) may be caused when image data of a pixel is read before the image data of the pixel is stored (renewed). It is thus preferable that the frame memory 232 arbitrates between the processes for storing and reading image data so as to avoid such problems. The method of arbitration may be any known methods.

The series of the processes for obtaining image data and transmitting the obtained image data by the computer 100 and displaying the image by the projector 200 are repeatedly executed. Thus, image displayed by the projector 200 is repeatedly renewed.

As discussed above, the size of the packets transmitted from the computer 100 to the projector 200 is fixed (data length: 32 bits) in the first embodiment. Thus, the communication processes can be simplified compared with the case where variable length packets are used. Particularly, since the command (FIG. 3A) is transmitted in one packet in the first embodiment, the communication processes can be further simplified. Moreover, since the definitions of the other bits are specified based on the values of the identifier bits at the predetermined positions in the packet, the display data and various commands can be separately and properly used.

In the first embodiment, the intermediate image data packet (FIG. 3C) and the last image data packet (FIG. 3D) are separately identified based on the values of the identifier bits. Thus, the memory controller 230 can appropriately judge the end of reception of the entire image data.

B. Second Embodiment

Figure 8:
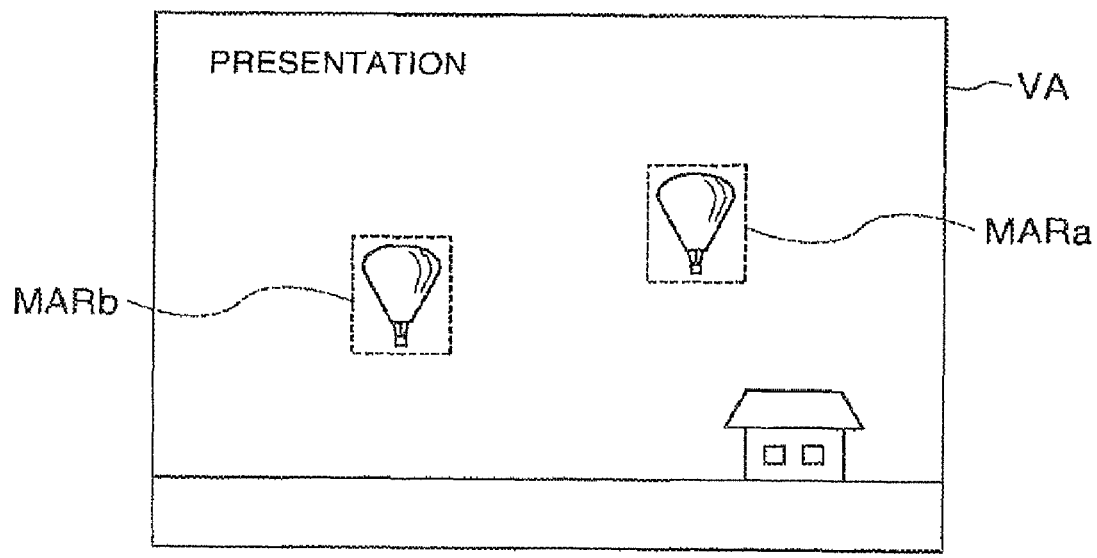
FIG. 8 illustrates an image transmitted from the computer 100 to the projector 200 in a second embodiment.

FIG. 8 illustrates an image transmitted from the computer 100 to the projector 200 in a second embodiment. The difference from the first embodiment is that only variable areas on the display screen VA are transmitted from the computer 100 to the projector 200 in this embodiment. The structures of the devices are similar to those in the first embodiment shown in FIGS. 1 and 2.

FIG. 8 shows two variable areas MARa and MARb. The capture module 150 (FIG. 2) captures only these variable areas and transmits them to the projector 200. The method of capturing images showing variable areas may be any methods. For example, the capture module 150 may continuously monitor the VRAM 114 to detect varied areas. In this case, the capture module 150 obtains image data of the variable areas from the VRAM 114. Alternatively, a picturing command for picturing a part of the screen included in picturing commands issued by a not-shown application program may be hooked to produce image data in accordance with the picturing command. In any cases, the capture module 150 obtains rectangular images containing the varied parts in this embodiment.

The image data obtained by the capture module 150 (FIG. 2) is corrected by the correction module 152 similarly to the case in the first embodiment. Then, the corrected image data is transmitted to the projector 200 via the communication module 154.

Figure 9:
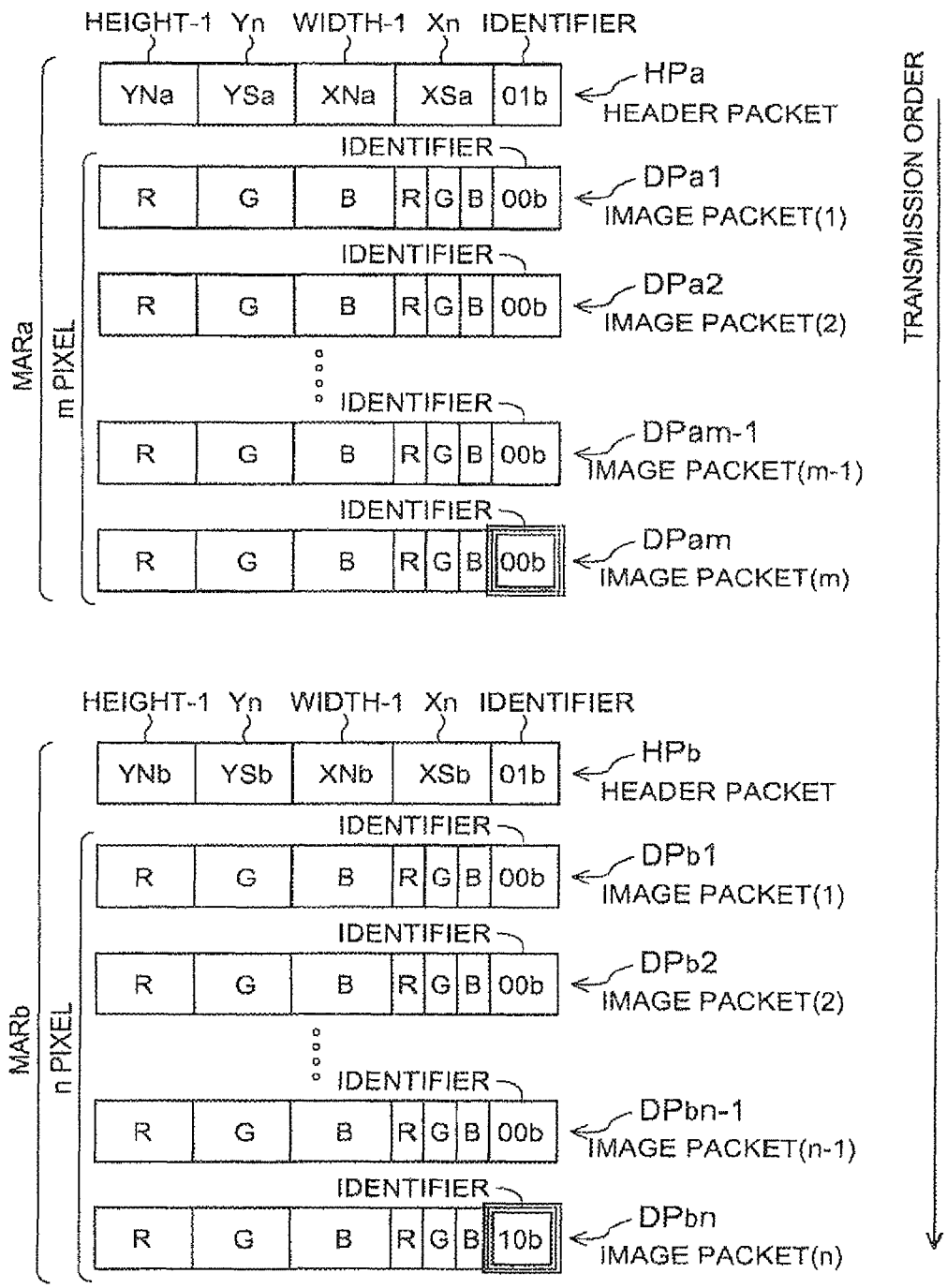
FIG. 9 schematically shows a transmitted packet.

FIG. 9 schematically shows packets to be transmitted. FIG. 9 contains transmissions of the two variable areas MARa and MARb shown in FIG. 8. According to the example shown in FIG. 9, packets of the first variable area MARa are initially transmitted, and subsequently packets of the second variable area MARb are transmitted. The packets for the first variable area MARa include a header packet HPa, and m (m: 1 or larger integer) image data packets DPa1 through DPam. The packets for the second variable area MARb include a header packet HPb and n (n: 1 or larger integer) image data packets DPb1 through DPbn. The correction module 152 successively transmits a plurality of variable areas one by one. The correction module 152 successively transmits the packets of the respective variable areas in the order of the header packet to the image data packets similarly to the example shown in FIG. 7.

The data values of these packets are established in the same manner as in the example shown in FIG. 7. However, identifier bits in the last image data packet DPam of the first variable area MARa are set not at "10b" but at "00b" since the image data packets further continue. Identifier bits in the last image data packet DPbn of the last variable area MARb are set at "10b" since this packet is the last image data packet.

Similarly to the case in the first embodiment, the memory controller 230 of the projector 200 receives the respective packets and stores the received image data in the frame memory 232. In this process, the memory controller 230 uses all the m image data packets received in the period from reception of the first header packet HPa until reception of the next second header packet HPb as image data in an area specified by the first header packet HPa. A new header packet is not received after the second header packet HPb, and the identifier bits in the last image data packet DPbn after the second header packet HPb are set at "10b". Thus, the memory controller 230 uses all the n image data packets received in the period from reception of the second header packet HPb until reception of the last image data packet DPbn as image data in an area specified by the second header packet HPb.

The memory controller 230 judges that reception of the display data of all the variable areas is finished by receiving the image data packet DPbn whose identifier bits are set at "10b". Thus, the memory controller 230 can supply the image data of all the variable areas to the liquid crystal driver 234. As a result, the projector 200 can display images containing renewed variable areas as shown in FIG. 8.

In this embodiment, image data of areas other than the variable areas in the screen (hereinafter referred to as "non-variable areas") are maintained without renewal. When the frame memory 232 has storage areas for two screens constituted by the display storage area and the renewal storage area, the memory controller 230 copies the image data of the non-variable areas from the display storage area to the renewal storage area. It is preferable that the image data is copied when the last image data packet (identifier bits are "10b") is received. This prevents unnecessary copying of the image data of the variable areas.

When the frame memory 232 has only the storage area for one screen, the memory controller 230 maintains the image data of the non-variable area without renewal. In this case, the memory controller 230 starts renewal of display images (in this embodiment, supply of image data to the liquid crystal driver 234) when the last image data packet (identifier bits are "10b") is received. When the last image data packet is received, pixel values (image data) of all the pixels are determined. Thus, erroneous supply of image data before renewal to the liquid crystal driver 234 is prevented.

In this embodiment, transmission of two variable areas is discussed. However, the same processes are executed when the number of the variable areas is one, three or larger numbers. In any cases, the identifier bits of the last image data packet for the variable area to be transmitted last are set at "10b". The identifier bits of the last image data packet for the variable area to be transmitted earlier are set at "00b".

A series of processes for acquisition of image data of variable areas and transmission of the acquired image data by the computer 100 and display of the renewed images by the projector 200 are repeatedly executed. However, as discussed in the first embodiment, image data showing the entire screen is transmitted at least once from the computer 100 to the projector 200. It is preferable that the entire screen is transmitted at the initial transmission of image data.

As explained above, the image transfer program 170 of the computer 100 obtains only variable areas in the screen and transmits the variable areas to the projector 200 in the second embodiment. The controller 230 of the projector 200 having received the variable areas renews only the variable areas. Thus, the data volume for transmission can be reduced. Accordingly, the renewal frequency of images to be displayed by the projector 200 can be increased.

When image data of plural areas is transmitted in the second embodiment, display data of each area is sequentially transmitted with a header packet which is identified separately from image data packets and is attached at the beginning of the display data. Thus, the memory controller 230 can check identifier bits and appropriately identify each display data without erroneous recognition of an image data packet as another display data packet.

In the second embodiment, the identifier bits in the last image data packet of the display data transmitted earlier are set at "00b" which shows that another image data packet follows. On the other hand, the identifier bits in only the last image data packet of the display data transmitted last are set at "10b" which shows that no image data packet follows. Thus, the memory controller 230 can appropriately determines that reception of all the variable areas has been finished by checking the identifier bits even when the plural variable areas (display data) are transmitted from the computer 100 to the projector 200.

The memory controller 230 renews the display images when the last image data packet (identifier bits are "10b") is received. Since the pixel data values (image data) of the variable areas and the pixel data values of the non-variable data are determined before renewal of the display images, the display image can be appropriately renewed. The method for the renewal of the display images is not limited to the above method but may be other various methods which can renew display images when the last image data packet (identifier bits are "10b") is received.

C. Third Embodiment

Figures 10A, 10B:
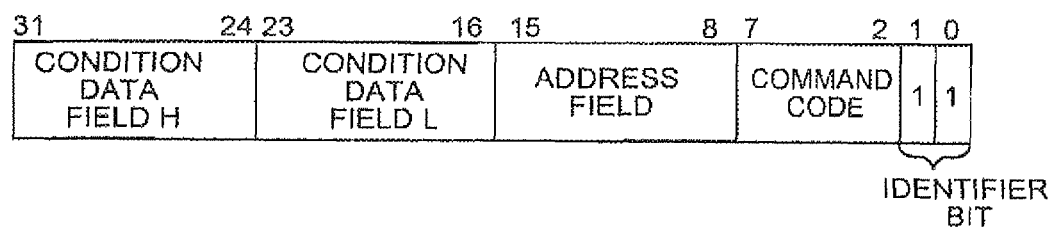
FIGS. 10A and 10B show a read command and a response packet for the read command, respectively.

FIGS. 10A and 10B show read commands and a response packet for the read commands. In a third embodiment, the computer 100 obtains condition data showing the condition of the projector 200 from the projector 200 by issuing read commands. The structures of the devices are similar to those shown in the first and second embodiments of FIGS. 1 and 2. The processes for transmitting image data and for transmitting commands for controlling the projector 200 (command shown in FIG. 4, for example) are executed in the same manner as in the first and second embodiments.

FIG. 10A shows an example of the read commands. The computer 100 obtains data contained in the register of the projector 200 as data showing the condition of the projector 200 by issuing read commands C11 through C13 shown in the figure.

The packet formats of the read commands C11 through C13 are similar to that of the command packet shown in FIG. 3A. Each command code is set at a code number given exclusively to the corresponding component. For example, the commands C11 and C12 whose command codes are set at "000011b" are commands for obtaining the lamp condition of the illumination optical system 235 (FIG. 2). The read command C13 whose command code is set at "000021b" is a command for obtaining the condition of the fan unit 260. Each of the command codes of the read commands C11 through C13 is different from any of command codes of control commands (such as commands C1 through C6 shown in FIG. 4). Thus, each command code of the plural commands including control commands and read commands is set at a value different from each other.

Each address field is set at a register address indicating a register storing target condition data. For example, control data showing the on-condition of the lamp is stored in the register 235R of the illumination optical system 235 whose address is "00h" (FIG. 4: commands C1 and C2). Thus, the first read command C11 whose address is "00h" in the read commands C11 and C12 for the illumination optical system 235 (FIG. 2) is used for obtaining the data showing the on-condition of the lamp. Similarly, the other commands C12 and C13 are used for reading data in the registers identified by the command codes and addresses.

In the read command, the values of the control data fields (FIG. 3A: 16th through 31st bits) are not used. Thus, predetermined dummy values (such as 0000h) are given to these fields so as to equalize the packet length.

FIG. 10B shows the format of the response packet. This response packet is a packet transmitted from the projector 200 to the computer 100 in response to the read command. The format of the response packet is similar to that of the command packet shown in FIG. 3A. The values of the identifier bits, the command code, and the address field are set at the same values as those of the original "read command". The values of the condition data fields (16th through 31st bits) are set at values indicating conditions.

FIG. 11 schematically illustrates issue of read commands by the computer 100. FIG. 11 contains only a part of the components of the computer 100 and the projector 200.

FIG. 11 shows the case where the first read command C11 (hereinafter also referred to as "lighting read command C11") and the third read command C13 (hereinafter also referred to as "fan read command C13") are issued in this order. These read commands C11 and C13 are transmitted to the projector 200 by using the communication module 154 under the control of the management module 156 similar to the control command (FIG. 5). The management module 156 can transmit other packets (such as next read command) before receiving the response packet for the previous read command.

Since the demultiplexer 212 of the projector 200 supplies the received data to the system controller 240 since the respective identifier bits of the received two commands (packets) C11 and C13 are set at "11b". The system controller 240 checks the conditions in response to the received read commands. According to the example shown in FIG. 11, the system controller 240 obtains the data from the register 235R (address: 00h) of the illumination optical system 235 in response to the lighting read command C11, and then obtains the data from the register 260R (address: 05h) of the fan unit 260 in response to the fan read command C13.

The time required for the period from the start of the data acquisition to the end of the data acquisition differs depending on the registers in some cases. According to this embodiment, when the system controller 240 receives a new read command, it starts data acquisition for the new read command even before completion of data acquisition for the read command previously received. Then, the system controller 240 transmits a response packet in the order of completion of data acquisition regardless of the order of reception of the read commands. Thus, the total time required for the response is not excessively prolonged. According to the example shown in FIG. 11, the system controller 240 completes data acquisition from the fan unit 260 before the end of data acquisition from the illumination optical system 235. As a result, a response packet R13 (hereinafter also referred to as "fan response packet R13") responding to the fan read command C13 received later is transmitted earlier than transmission of a response packet R11 (hereinafter also referred to as "lighting response packet R11") responding to the lighting read command C11 received earlier.

The identifier bits, the command code and the address in the fan response packet R13 are set at the same values as those in the read command C13 to which the fan response packet R13 responses. The condition data fields (16th through 31st bits: FIG. 10B) are set at data values obtained from the register. According to the example shown in FIG. 11, the condition data is set at "0001h", which indicates that the fan unit 260 is operating. The identifier bits, the command code and the address in the lighting response packet R11 are set at the same values as those in the lighting read command C11 to which the lighting response packet R11 responses. The condition data is set at "0000h", which indicates that the lamp is turned off (FIG. 4: first command C1).

The system controller 240 supplies data for specifying these response packets R11 and R13 (identifier bits, command code, address and condition data) to the demultiplexer 212. The demultiplexer 212 produces the respective response packets R11 and R13 by using the data received from the system controller 240, and transmits the produced response packets R11 and R13 to the computer 100 according to the USB protocol.

Since the identifier bits in the received packets are set at "11b", the communication module 154 of the computer 100 supplies the received data to the management module 156. The management module 156 specifies the correspondences between the transmitted read commands and the received data by checking the combinations of the identifier bits, the command codes and the addresses. The management module 156 can use the received condition data for various purposes. For example, the management module 156 may indicate the conditions on the display device 118 of the computer 100. Also, the management module 156 may perform predetermined processes based on the condition data. These processes executed may be arbitrarily determined. For example, when the lamp is turned on, the management module 156 may issue the second command C2 for turning on the lamp before the image transfer program 170 starts transmission of image data.

When another read command is issued, the projector 200 transmits condition data to the computer 100 in the similar manner. The management module 156 may issue respective read commands in response to commands by the user or may automatically issue respective read commands. Requirements for automatically issuing the read commands may be arbitrarily determined. For example, the projector 200 may issue the lighting read command C11 to judge whether the second command C2 (FIG. 4) for turning on the lamp needs to be issued or not when the projector 200 detects connection with the computer 100.

In the third embodiment, therefore, the management module 156 obtains condition data from the projector 200 and thus performs processes according to the conditions of the projector 200. The response packet contains the information for specifying the read command to which the response packet responses (identifier bits, command code and address in the third embodiment). Thus, the management module 156 can easily determine the correspondence between the received data and the transmitted read command. Particularly when the management module 156 receives the response packet in the order different from the transmission order of plural types of the read commands, it appropriately judges to which read command each response packet responses. Moreover, since the response is transmitted in one packet in the third embodiment, the communication processes can be simplified.

D. Fourth Embodiment

Figure 12A:
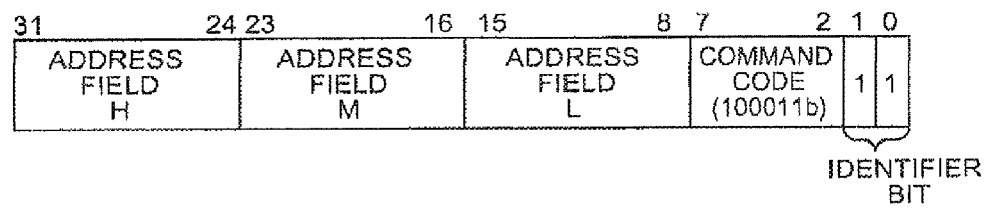
FIGS. 12A and 12B show a ROM read command and a response packet for the ROM read command, respectively.
Figure 12B:
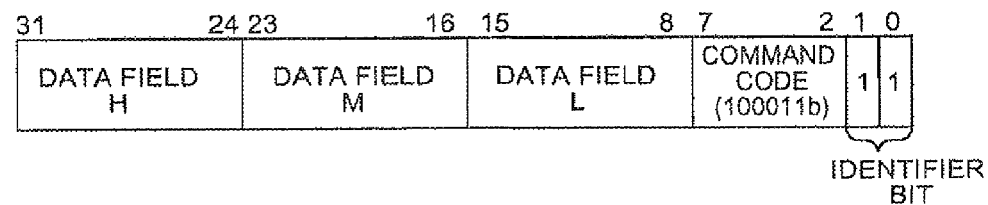

FIGS. 12A and 12B show a ROM read command and a response packet for the ROM read command. In a fourth embodiment, the computer 100 obtains data from the ROM 252 of the projector 200 (FIG. 2) by issuing the ROM read command. The structures of the devices are similar to those in the first through third embodiments shown in FIGS. 1 and 2. The processes for transmitting image data and commands for controlling the projector 200 (such as commands shown in FIG. 4) and for obtaining condition data indicating the conditions of the projector 200 are performed in the same manner as in the first through third embodiments.

FIG. 12A shows a format of the ROM read command. This command is different from the command packet shown in FIG. 3A only in that the 16th through 31st bits as well as the 8th through 15th bits are used for specifying an address. The lower part of the address is stored in the 8th through 15th bits, the intermediate part of the address is stored in the 16th through 23rd bits, and the upper part of the address is stored in the 24th through 31st bits. The command code is set at a predetermined value ("100011b" in the example of FIGS. 12A and 12B) different from any other command codes.

The number of bits showing the address (memory address) of the ROM 252 (24 bits in the example of FIG. 12A) is larger than the number of bits showing the address of the register in the first through third embodiments (8 bits in the example of FIG. 3A) because the memory having larger capacity than that of the register is used as the ROM 252. In the fourth embodiment, a parameter for correcting VT (applied voltage V–light transmissivity T) is stored in the ROM 252. More specifically, a lookup table (LUT) showing the correspondences between values of the respective color components RGB before correction and those values after correction is stored in the ROM 252. The LUT is prepared for compensating for the characteristics peculiar to each individual liquid light valve 236 based on measurement results of VT characteristics of each individual liquid crystal light valves 236. The LUT is stored in the ROM 252 at the time of manufacture of the projector 200. The LUT is read by the computer 100 when the projector 200 is operated to be used for VT correction. As a result, the differences among display screens produced by each individual projector 200 can be reduced.

Since the LUT contains correspondences associated with various input values, the data volume of the LUT often increases. Accordingly, a medium having sufficient capacity for storing the LUT is used as the ROM 252, and thus the number of bits of the address of the ROM 252 (24 bits) is larger than the number of bits (8 bits) of the register address.

FIG. 12B shows the packet format of the ROM read command response. The packet of the ROM read command response (hereinafter also abbreviated as "ROM response") is transmitted from the projector 200 to the computer 100 in response to the ROM read command. The 0th through 7th bits are set at the same value as that of the ROM read command packet (FIG. 12A). The 8th through 31st bits contain the read data. In the fourth embodiment, the size of the storage area designated by one address in the ROM 252 is "24 bits" which is larger than the size in the register in the first through third embodiments (FIG. 3A: 16 bits). The 8th through 15th bits contain the lower part of the data, the 16th through 23rd bits contain the intermediate part of the data, and the 24th through 31st bits contain the upper part of the data. The ROM response packet does not contain the address designated by the ROM read command to which the ROM response packet responses, the details of which will be described later.

Figure 13:
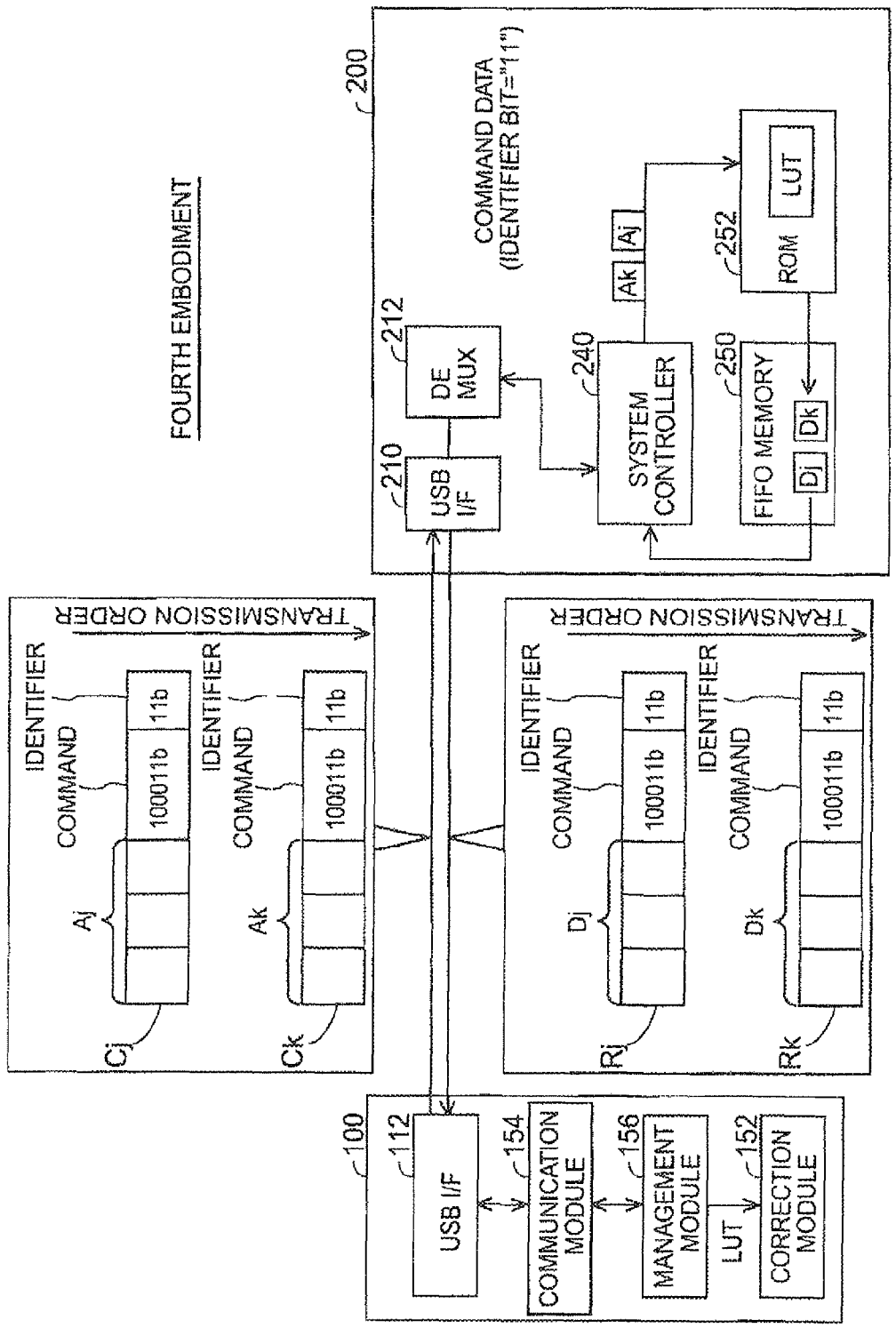
FIG. 13 schematically shows issue of a ROM read command from the computer 100.

FIG. 13 schematically illustrates issue of the ROM read command by the computer 100. FIG. 13 shows only a part of the structures of the computer 100 and the projector 200.

FIG. 13 shows the case where the management module 156 issues two ROM read commands Cj and Ck for reading different addresses Aj and Ak in this order. These ROM read commands Cj and Ck are transmitted to the projector 200 by the communication module 154 controlled by the management module 156 similarly to the command for control (FIG. 5). The communication module 154 transmits the commands Cj and CK to the projector 200 in the order of issue. The management module 156 can transmit other packets (such as ROM read command for another address and read command for register) before receiving the ROM response packet for the ROM read command issued previously.

The demultiplexer 212 of the projector 200 supplies the data of the commands Cj and Ck whose identifier bits are "11b" to the system controller 240. Since the command code is set at "100011b", the system controller 240 issues data read requirement for reading data at the memory addresses specified by the commands Cj and Ck to the ROM 252. The ROM 252 supplies the data stored at the specified address to the FIFO memory 250 in response to the requirement from the system controller 240.

Since the USB interface is used in the communication between the communication module 154 and the demultiplexer 212, the plural packets are received by the receiver side in the same order as the order of transmission by the transmitter side. The demultiplexer 212 supplies the received data (ROM read command) to the system controller 240 in the order of reception of the data. The system controller 240 issues the data read requirement to the ROM 252 in the order of reception of the original ROM read command. The ROM 252 supplies the data at the specified address to the FIFO memory 250 in the order of reception of the data read requirement. Thus, data is stored in the FIFO memory 250 in the order of addresses required by the management module 156. More specifically, data Dj of the earlier command Cj (address Aj) is initially stored, and then data Dk of the later command Ck (address Ak) is stored.

Next, the system controller 240 obtains data from the FIFO memory 250, stores the obtained data in the ROM response packet (FIG. 12B), and transmits the ROM response packet to the computer 100. In this process, the system controller 240 transmits the data to the computer 100 in the order of reading the data from the FIFO memory 250 without checking the address of the data obtained from the FIFO memory 250. As well known in the art, the data stored first is read from the FIFO memory 250 first. Thus, the system controller 240 initially transmits a ROM response packet Rj containing the earlier data Dj, and then transmits a ROM response packet Rk containing the later data Dk. Transmission of these packets Rj and Rk is executed in the same manner as in the case of response packets R11 and R13 shown in the example of FIG. 11.

Since the identifier bits of the received packet are set at "11b", the communication module 154 of the computer 100 supplies the received data to the management module 156. Since the command code is set at "100011b", the management module 156 judges that the received data is the response to the ROM read command (ROM response). In this process, the communication module 154 supplies the received data (ROM response) to the management module 156 in the order of reception of the data. The transmission order of the ROM response packet is the same as the transmission order of the original ROM read command as discussed above. Thus, the management module 156 can specify the correspondence between the transmitted ROM read command and the received ROM response based on the order of reception of the ROM response even though the ROM response does not contain the memory address. For example, the management module 156 judges that the data Dj received earlier is the response to the ROM read command Cj issued earlier and that the data Dk received later is the response to the ROM read command Ck issued later.

The LUT is stored at predetermined plural addresses of the ROM 252. Thus, the management module 156 obtains the entire LUT by issuing the ROM read command to each of the addresses, and supplies the obtained LUT to the correction module 152. The correction module 152 applies VT correction by using the LUT provided exclusively for each individual projector 200.

In the fourth embodiment, therefore, the management module 156 and the system controller 240 use two types of packets whose address areas indicating addresses have different lengths as the packets for use in the process for reading out the data in the memory (resister) of the projector 200. More specifically, when data is read from the ROM 252, a packet for a ROM read command which indicates an address by 24 bits is used as shown in FIGS. 12A and 12B and FIG. 13. When data is read from the register, a packet for a read command which indicates an address by 8 bits is used as shown in FIGS. 10A and 10B and FIG. 11. Thus, even when plural types of memories (registers) having different address lengths are included in the projector 200, the computer 100 can appropriately specify the addresses of these memories.

The management module 156 and the system controller 240 identify these packets based on command codes. Thus, when the command code is set at a value for ROM 252 ("100011b" in this embodiment), the data in the 8th through 31st bits is used as an address. When the command code is set at a value for register (such as "000011b", FIG. 10A), only the data in the 8th through 15th bits is used as an address and the data in the 16th through 31st bits is not used as an address. Thus, the management module 156 and the system controller 240 can appropriately identify the packets (specify the definitions of the respective bits) based on the information at the predetermined positions in the packets (command codes).

In the fourth embodiment, the data in the ROM is transmitted to the computer 100 by the system controller 240 in the order of addresses required by the management module 156. Thus, the management module 156 can specify the address of the received data based on the order of data reception. Since it is unnecessary to transmit the address to the computer 100 from the projector 200, the data volume can be reduced. Moreover, when the address length is long, the entire data can be transmitted in one packet by eliminating the address. As a result, the necessity for dividing data into plural packets and increasing the packet length (size) larger than lengths of other types of packets so as to transmit data at one address can be eliminated. Accordingly, the communication processes executed by the system controller 240 and the management module 156 are simplified.

The projector 200 may have any structure for transmitting data to the management module 156 in the order of requirement. For example, the system controller 240 may transmit data read from the ROM 252 to the computer 100 while supervising the transmission order without using the FIFO memory 250. It is preferable, however, that the projector 200 has the structure shown in FIG. 13, in which: the system controller 240 issues read requirement to the ROM 252 in the order of reception of the ROM read command; the ROM 252 sequentially supplies the required data to the FIFO memory 250; and the system controller 240 transmits the data to the computer 100 in the order of reading the data from the FIFO memory 250. According to this structure, the system controller 240 need not supervise the data transmission order, and thus the processes performed by the system controller 240 can be simplified. The timing for obtaining data from the FIFO memory 250 by using the system controller 240 may be arbitrarily determined. Thus, the system controller 240 can execute other processes (such as processes for receiving other packets and for transmitting data obtained from register) while data is being supplied from the ROM 252 to the FIFO memory 250. Accordingly, the total time required for the response from the projector 200 is not excessively prolonged.

The data stored in the ROM 252 is not limited to the LUT for VT correction, but may be any data used by the computer 100. For example, parameters used for gamma correction may be stored.

E. Modified Example

Components and elements used in the first through fourth embodiments other than those specified in the independent claims according to the invention are only supplemental components and elements, and thus may be eliminated if necessary. As obvious, the invention is not limited to the embodiments and examples described and depicted herein but various modifications and variations of the invention are possible. It is therefore understood that the invention may be practiced otherwise within the scope and spirit of the invention. For example, the following modifications are possible.

Modified Example 1

In the above embodiments, the number of bits in each data may be arbitrarily determined. Three or more types of memory (register) having different address lengths may be used.

Modified Example 2

In the above embodiments, the communication interface is not limited to the USB interface but may be other types of interfaces. For example, IEEE1394 interface may be used. In any cases, it is preferable to use such interface which allows the receiver side to receive plural packets in the same order as the order of transmission of these packets by the transmitter side. According to this structure, the address of the memory can be eliminated from the response for the read command for the memory as in the fourth embodiment shown in FIGS. 12A and 12B and FIG. 13.

Modified Example 3

In the third embodiment shown in FIGS. 10A and 10B and FIG. 11, the system controller 240 may transmit the response packet in the order of reception of the read command in the same manner as in the ROM response shown in FIGS. 12A and 12B and FIG. 13. In this process, the data read from the register may be temporarily stored in the FIFO memory as in the example shown in FIG. 13, and the system controller 240 may transmit the data read from the register to the computer 100 while supervising the order of transmission. However, when it is possible that both the read address and data are contained in one packet, the system controller 240 preferably transmits the response packet containing the address and read data in the order of completion of data acquisition regardless of the order of reception of the read command.

Modified Example 4

In the above embodiments, the register as the target of the read command may be provided in the system controller 240. The read data is not limited to the data showing the conditions of the control target, but may be data showing various conditions. For example, the read data may be the total lighting time of the lamp. In this case, the system controller 240 transmits time data read from a timer measuring the total lighting time to the computer 100.

The method of controlling the projector 200 by using the system controller 240 is not limited to the method of writing control data to the register, but may be any other methods. For example, the system controller 240 may directly operate the switch of the lamp. The command issued to the projector 200 is not limited to data writing to the memory and data reading from the memory, but may be other various command types. For example, the command may be one for operating the switch of the lamp. In this case, the switch of the lamp may be operated when the system controller 240 receives the first command C1 or the second command C2 shown in FIG. 4, for example. Alternatively, the command may be one for obtaining the measurement result of a temperature sensor for the lamp (not shown). In this case, the system controller 240 obtains the measurement result from the temperature sensor and transmits the obtained temperature data to the computer 100 when receiving a command packet whose command code is set at a predetermined value.

Modified Example 5

In the above embodiments, the computer 100 may constantly transmit image data showing the entire display screen VA to the projector 200. In this case, the position may be eliminated from the header packet of the display data. When the image size (width and height) is fixed, the header packet may be eliminated. However, as in the second embodiment shown in FIGS. 8 and 9, it is preferable that the display data contains the information showing the position and size (width and height) of the variable areas and the image data of the variable areas. This is because the data volume for transmission is reduced by transmitting only the data associated with the variable areas (information on variable areas and their image data).

Modified Example 6

While the projector 200 is used as a data processing device in the above embodiments, other types of image output device other than the projector 200 may be used. For example, a printer may be used. In this case, the same packet formats as shown in FIGS. 3A through 3D may be adopted. In this case, the printer performs printing using the display data.

The invention is applicable not only to the image output device but also to other types of data processing device. For example, the invention is applicable to an audio data processing device for processing audio data received from a data supply device.

Modified Example 7

While the personal computer is used as the image supply device in the above embodiments, other types of computer (mobile computer, hand-held computer, workstation and the like) may be used as the image supply device in lieu of the personal computer. Alternatively, a device other than the computer which has interface and the same functions as those of the computer may be used. Examples of this device include a personal data assistant, a cellular phone, a mail terminal, a game machine, a set top box, and other devices. The image display device may be various types of display device other than the projector.

Modified Example 8

A part of the function provided by using software may be provided by hardware, or a part of the function provided by using hardware may be provided by software.

The entire disclosure of Japanese Patent Application No. 2006-085922, filed Mar. 27, 2006 is expressly incorporated by reference.

What is claimed is:

1. An image display system including an image supply device and an image display device,
the image supply device comprising:
a memory that is configured to:
supply data for producing a packet to be transferred to the image display device; and
generate a command packet and a data packet, each of a same common fixed length, and produce the command packet as a packet with an identifier set to a predetermined value at a predetermined position to indicate command data, and the data packet as a packet with an identifier set to a value different from the predetermined value at the predetermined position; and
a communication interface that is configured to send the command packet or the data packet as the packet; and
the image display device comprising:
a communication interface that is configured to receive the packet from the image supply device;
a device processor;
a data processor; and
a demultiplexer,
wherein, in a case where the identifier of the received packet is set to the predetermined value, the demultiplexer transfers the packet to the device processor, and in a case where the identifier of the received packet is set to a different value from the predetermined value, the demultiplexer transfers the packet to the data processor.

2. The image display system according to claim 1, wherein the command packet includes at least one of a command code, an address field and a control data field for at least one of turning on or off of a lamp of the image display device, brightness of the lamp, controlling a fan unit of the image display device.

3. The image display system according to claim 1, wherein the data packet includes designation of image blocks and image data for an image to be displayed by the image display device.

4. The image display system according to claim 3, wherein the designation of image blocks includes designation of starting blocks for a width and a height of the image blocks.

5. The image display system according to claim 3, wherein the identifier indicates that the data packet is one of a header packet, an image data packet leading other image data packet, or an ending image data packet.

6. The image display system according to claim 1, wherein the command packet includes a read command that requests the image display device to transmit a response packet that indicates a status of the image display device to the image supply device.

7. An image supply device supplying image data to an image display device comprising:
a memory that is configured to:
supply data for producing a packet to be transferred to the image display device; and
generate a command packet and a data packet, each of a same common fixed length, and produce the command packet as a packet with an identifier set in a predetermined value at a predetermined position indicating command data, and the data packet as a packet with an identifier set to a value different from the predetermined value at the predetermined position; and
a communication interface that is configured to send the command packet or the data packet as the packet.

8. The image supply device according to claim 7, wherein the command packet includes at least one of a command code, an address field and a control data field for at least one of turning on or off of a lamp of the image display device, brightness of the lamp, controlling a fan unit of an image display device.

9. The image supply device according to claim 7, wherein the data packet includes designation of image blocks and image data for an image to be displayed by an image display device.

10. The image supply device according to claim 9, wherein the designation of image blocks includes designation of starting blocks for a width and a height of the image blocks.

11. The image supply device according to claim 9, wherein the identifier indicates that the data packet is one of a header packet, an image data packet leading other image data packet, or an ending image data packet.

12. The image supply device according to claim 7, wherein the command packet includes a read command that requests the image display device to transmit a response packet that indicates a status of an image display device to the image supply device.

13. An image display device comprising:
- a communication interface that is configured to receive a packet from an image supply device, the packet being a command packet and a data packet, each of a same common fixed length, the command packet having an identifier that is set in a predetermined value at a predetermine position indicating command data, and the data packet having an identifier that is set to a value different from the predetermined value at the predetermined position;
- a device processor;
- a data processor; and
- a demultiplexer,
wherein, in a case where the identifier of the received packet is set to the predetermined value, the demultiplexer transfers the packet to the device processor, and in a case where the identifier of the received packet is set to a different value from the predetermined value, the demultiplexer transfers the packet to the data processor.

14. The image display device according to claim 13, wherein the command packet includes at least one of a command code, an address field and a control data field for at least one of turning on or off of a lamp of the image display device, brightness of the lamp, controlling a fan unit of the image display device.

15. The image display device according to claim 13, wherein the data packet includes designation of image blocks and image data for an image to be displayed by the image display device.

16. The image display device according to claim 15, wherein the designation of image blocks includes designation of starting blocks for a width and a height of the image blocks.

17. The image display device according to claim 15, wherein the identifier bit indicates that the data packet is one of a header packet, an image data packet leading other image data packet, or an ending image data packet.

18. The image display device according to claim 13, wherein the command packet includes a read command that requests the image display device to transmit a response packet that indicates a status of the image display device to an image supply device.

19. A projector comprising the image display device of claim 13.

* * * * *